United States Patent
Li

(10) Patent No.: US 8,843,986 B2
(45) Date of Patent: Sep. 23, 2014

(54) TRANSPORT STREAM, DATA PROCESSING DEVICE AND DIGITAL TELEVISION FOR INTERMITTENTLY UPDATING FIRMWARE

(75) Inventor: Cheng Hao Li, Hsinchu County (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 592 days.

(21) Appl. No.: 13/170,341

(22) Filed: Jun. 28, 2011

(65) Prior Publication Data

US 2012/0117607 A1 May 10, 2012

(30) Foreign Application Priority Data

Nov. 5, 2010 (TW) ................................ 99138109 A

(51) Int. Cl.
- *H04N 7/173* (2011.01)
- *H04N 21/262* (2011.01)
- *H04N 21/236* (2011.01)
- *H04N 21/81* (2011.01)

(52) U.S. Cl.
CPC ....... *H04N 21/818* (2013.01); *H04N 21/26291* (2013.01); *H04N 21/23617* (2013.01)
USPC .................. 725/132; 725/87; 725/92; 725/93

(58) Field of Classification Search
USPC ........................................ 725/87, 92, 93, 132
See application file for complete search history.

(56) References Cited

U.S. PATENT DOCUMENTS

| 8,463,883 | B2 * | 6/2013 | Nicoulin et al. ............... 709/221 |
| 2002/0184208 | A1 * | 12/2002 | Kato ................................. 707/4 |
| 2007/0146542 | A1 * | 6/2007 | Strasser ......................... 348/462 |

* cited by examiner

*Primary Examiner* — Kieu Oanh T Bui
(74) *Attorney, Agent, or Firm* — WPAT, PC; Justin King

(57) ABSTRACT

A transport stream (TS) includes a plurality of first download data blocks (DDBs), a plurality of second download data blocks, and a download information indication (DII). Each download data block includes a first processing method tag and a first content data. The first processing method tag is for indicating a first data processing method, and the first content data forms a part of a firmware after having been processed according to the first data processing method. Each second DDB includes a second processing method tag and a second content data. The second processing method tag is for indicating a second data processing method different from the first data processing method, and the second content data forms another part of the firmware after having been processed according to the second data processing method. The DII includes information for controlling the first DDBs and the second DDBs.

19 Claims, 4 Drawing Sheets

TRANSPORT STREAM, DATA PROCESSING DEVICE AND DIGITAL TELEVISION FOR INTERMITTENTLY UPDATING FIRMWARE

CROSS REFERENCE TO RELATED PATENT APPLICATION

This patent application is based on Taiwan, R.O.C. patent application No. 099138109 filed on Nov. 5, 2010.

FIELD OF THE INVENTION

The present invention relates to a transport stream (TS), a data processing apparatus, and a digital television (TV), and more particularly, to a transport stream, a data processing apparatus, and a digital TV capable for intermittently updating a firmware of the digital TV.

BACKGROUND OF THE INVENTION

In digital broadcasting, a TV signal is compressed to a digital signal carrying at least an audio-visual (AV) data for broadcasting. Typically upon reception, a digital TV renders or displays the AV data carried in the digitalized TV signal. The success of the digital TV mainly results from development and implementation of Motion Picture Experts Group 2 (MPEG-2) and MPEG-4 video compression technologies.

For example, a digital broadcasting system is a US Advanced Television Systems Committee (ATSC) system or a European Digital Video Broadcasting-Terrestrial (DVB-T) system. Examples of the middle ware technology of the digital broadcasting include a DVB multimedia home platform (DVB-MHP), an OpenCable application platform (OCAP), and an advanced common application platform (ACAP). DVB-MHP is a middle ware system applied to the European digital TV designed in the DVB project. OCAP is a middle ware system applied to the US Cable Corporation. ACAP is comparable to the OCAP applied to cable broadcasting and a digital TV application software environment (DASE) applied to ground-ware broadcasting.

In addition to AV data transmission, the digital broadcasting system is able to broadcast content file data such as a webpage file, text file, or audio file. A digital storage media command and control (DSM-CC or DSM-CC) standard is a protocol for providing control functions and operations for managing transport streams, suitable for performing content file data broadcasting. DSMCC provides two methods for carrying data—data carousel and object carousel. The data carousel is applied to data transmission, and the object carousel is based on data carousels to provide files, indexes, and data streams to transmitted data. Elements of DSMCC carousels are contained in a DSMCC message. There are two types of DSMCC message: a DSMCC download data message and a DSMCC download control message. The DSMCC download data message comprises real data of a module, and the DSMCC download control message is used to inform a receiver how to form data into information of the module. For example, the DSMCC download data message is a download data block (DDB) message. The DSMCC download control message includes a download information indication (DII) message and/or a download server initiate (DSI) message.

According to the DSMCC data broadcasting standard, a module comprises a data object, such as a file. FIG. 1 shows a structure of the DVB data carousel. A module 12 comprises at least one block 11 transmitted as a DDB 111. The DDB 111 recording an MPEG data section is received by a DSMCC receiver in a received transport stream. In order to obtain an object from the broadcasting network, each module 12 containing the object is obtained. The transmission parameters of each module 12 such as a module version, a module size, a block size, timing, and a broadcasting channel, are recorded in a DII 131. In addition, in a complicated system, a plurality of groups 13 form a large group 14, and transmission parameters of the groups 13 are recorded in a DSI 141. Therefore, the DSMCC receiver of a digital TV combines the modules 12 to a group 13 after having received the DII 131, and combines the groups 13 to the large group 14 after having received the DSI 141, so that the digital TV is able to render and display the content file data in the transport stream.

The digital TV is provided with a firmware to associate with a processor for processing a received TV signal. When the video compression technology, the DSMCC standard, or an operating interface develops and changes, the firmware of the digital TV needs to be updated. In the prior art, the firmware is typically updated by connecting to a host computer via a connection interface. Alternatively, all firmware programs are compressed to a compressed file that is carried in a module 12 of a transport stream, and the digital TV in a night sleep state downloads the DDBs 111 of the module 12 to obtain the compressed file that is to be decompressed so as to update the firmware of the digital TV.

SUMMARY OF THE INVENTION

One object of the present invention is to provide a transport stream carrying a file having a small capacity, and a data processing apparatus and digital TV for receiving and processing the transport stream.

According to an embodiment of the present invention, a transport stream, a data processing apparatus, and a digital TV capable of intermittently updating a firmware of the digital TV are provided.

According to another embodiment of the present invention, a transport stream carrying a firmware is received by a digital TV. The transport stream comprises at least a DSMCC section that comprises a plurality of first DDBs, a plurality of second DDBs, and at least a DII. Each first DDB comprises at least one first processing method tag and one first content data. The first processing method tag represents a first data processing method, and the first content data forms a part of a firmware after having been processed according to the first data processing method. Each second DDB comprises at least one second processing method tag and one second content data. The second processing method tag represents a second data processing method, and the second content data forms another part of the firmware after having been processed according to the second data processing method. The DII comprises information for controlling the first DDBs and the second DDBs, and the first data processing method is different from the second data processing method.

According to yet another embodiment of the present invention, a data processing apparatus capable of processing a transport stream carrying a firmware and comprising at least one DSMCC section comprises a DSMCC section receiving unit and a DSMCC section analyzing unit. The DSMCC section receiving unit receives the transport stream and retrieves a DSMCC section from the transport stream. The DSMCC section analyzing unit comprises a DDB analyzing unit and a DII analyzing unit. The DDB analyzing unit comprises a processing method identifying unit for identifying a processing method tag of at least one DDB of the DSMCC section, and for processing a content data of the DDB of the DSMCC section according to a data processing method indicated by the processing method tag, so as to a form a part of the firmware. The DII analyzing unit analyzes one DII of the DSMCC section, and retrieves from the DII information for controlling the DDB.

According to still another embodiment of the present invention, a digital TV is capable of receiving a transport stream that comprises at least one DSMCC section and carries a first firmware and a content file data. The digital TV comprises a first memory module, a second memory module, a data processing apparatus, and a display panel. The first memory module comprises a first memory unit. The second memory module comprises a DDB memory unit and a DII memory unit. The data processing apparatus comprises a DSMCC section receiving unit and a DSMCC section analyzing unit. The DSMCC section receiving unit receives the transport stream, and retrieves the DSMCC section from the transport stream. The DSMCC section analyzing unit comprises a DDB analyzing unit and a DII analyzing unit. The DDB analyzing unit comprises a processing method identifying unit. When the DDB analyzing unit determines that at least one DDB of the DSMCC section comprises a part of one content file data, the part of the content file data of the DDB is retrieved and is stored into the DDB memory unit; when the processing method identifying unit of the DDB analyzing unit determines a processing method tag of the DDB of the DSMCC section, one content data of the DDB of the DSMCC section is processed according to a data processing method indicated by the processing method tag, so as to form a part of the first firmware. The DII analyzing unit analyzes a DII of the DSMCC section, and retrieves and stores information for controlling the DDBs to the DII memory unit. The content file data is then displayed on a display panel.

According to still another embodiment, a transport stream carrying a firmware and comprising at least one DSMCC section is received by a digital TV. The DSMCC section comprises a plurality of DDBs and at least one DII. Each DDB comprises at least one writing position tag and a content data. The writing position tag indicates a position, of a memory unit of the digital TV, where the content data is to be written. The DII comprises information for controlling the DDBs.

The advantages and spirit related to the present invention can be further understood via the following detailed description and drawings.

DETAILED DESCRIPTION OF THE PREFERRED EMBODIMENT

According to an embodiment of the present invention, a firmware of a digital TV is carried in a transport stream that is analyzed via the digital TV to retrieve the firmware carried in the TV, so as to update the firmware. Details of embodiments of the present invention are described below.

In an embodiment, through various compression methods, such as some free software like a zlib function database, the firmware of the digital TV is compressed to carry in the transport stream TS so that transmission speed can be accelerated. When the zlib compression method is used, different entropies of files can result using different compression ratios.

Figure 1:
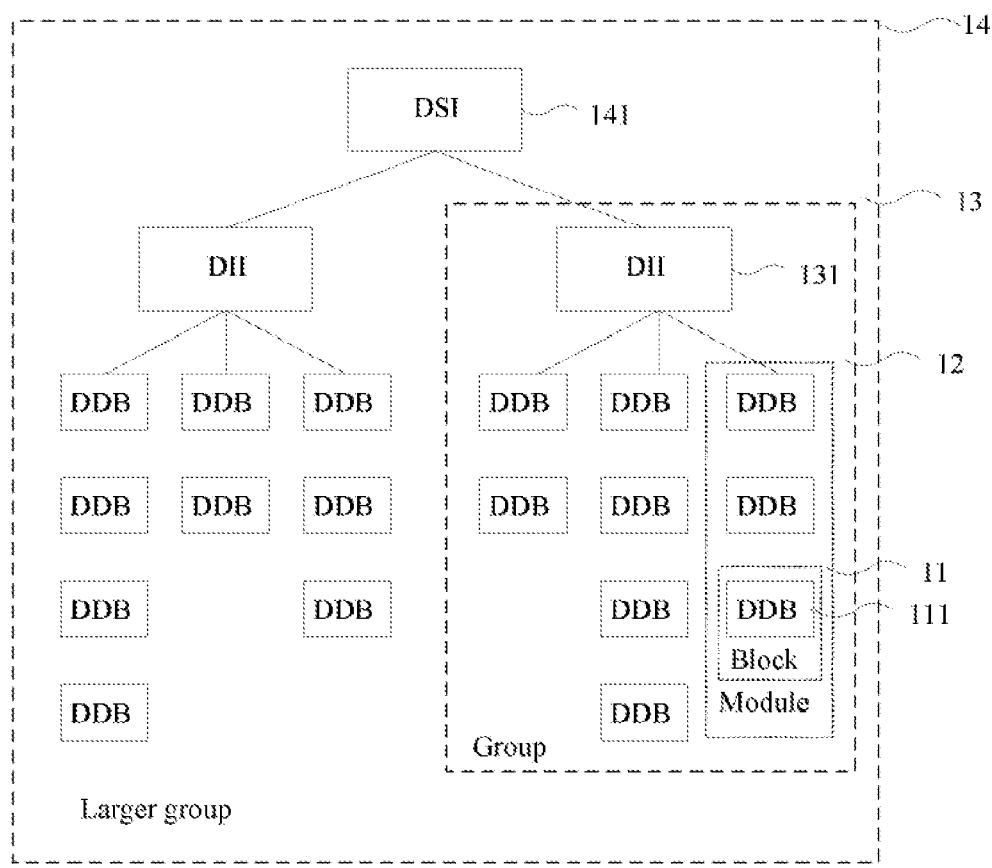
FIG. 1 is a schematic diagram of a structure of a DVB data carousel.
Figure 2:
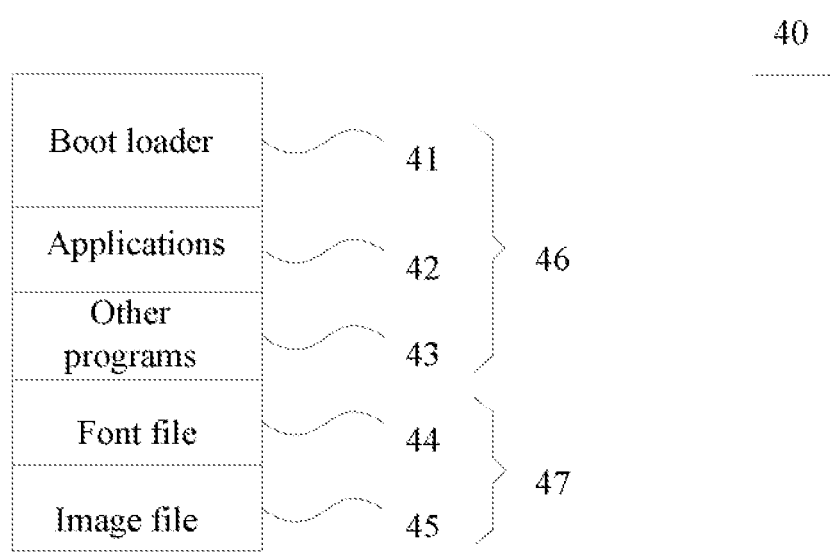
FIG. 2 is a schematic diagram of a structure of a firmware of a digital TV in accordance with an embodiment of the present invention.

FIG. 2 is a schematic diagram of a structure of a firmware of a digital TV in accordance with an embodiment of the present invention. A firmware 40 comprises various types of files. For example, the firmware 40 comprises a boot loader 41, an application program 42, other programs 43, a font file 44, and an image file 45. Files of the boot loader 41, the application programs 42, and other programs 43 potentially have higher entropies, while the font file 44 and the image file 45 typically have lower entropies. Therefore, to reduce a file size of the firmware 40 compressed with the zlib compression method, a first part 46 of the firmware 40, including the files having higher entropies such as the boot loader 41, the application programs 42, and other programs 43, are compressed, and a second part 47 of the firmware 40, including the files having lower entropies such as the font file 44 and the image file 45, having lower entropies, are not compressed; these two parts are combined to form a reduced-size firmware 40. The processed firmware 40 is embedded in a transport stream conforming to the DSMCC standard via a transport stream generator (not shown). In an embodiment, the processed firmware 40 mixed with a content file data Ct is embedded in the transport stream conforming to the DSMCC standard; however, it shall not be construed as limiting the present invention.

Figure 3:
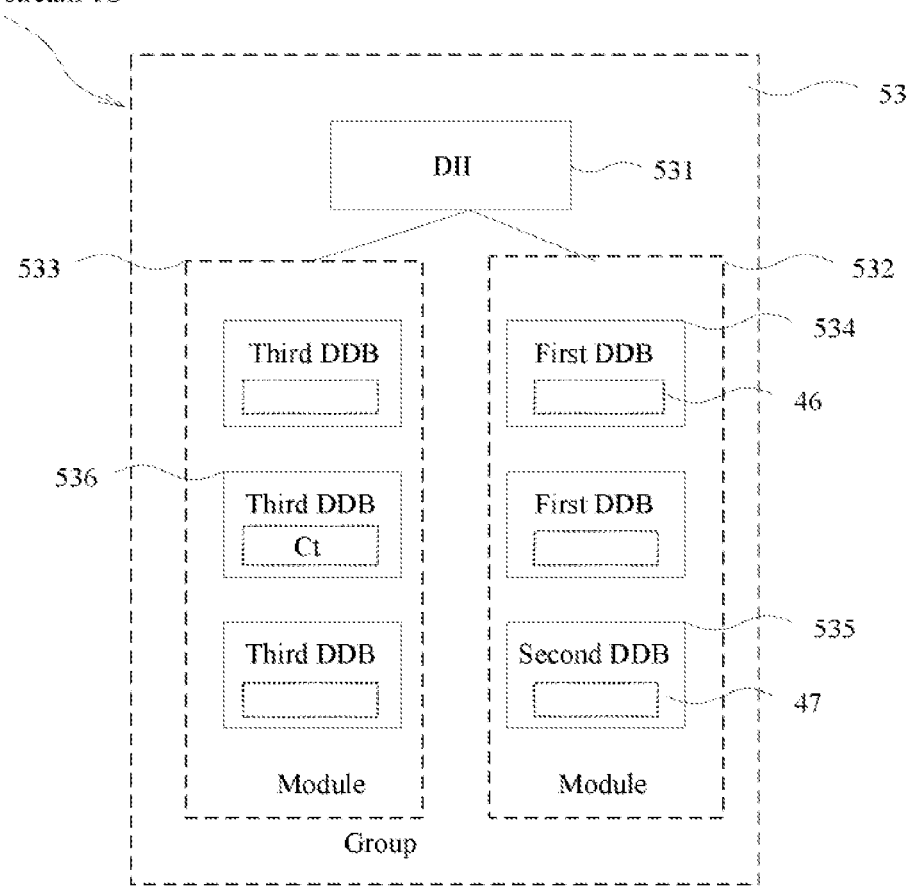
FIG. 3 is a schematic diagram of a structure of a data carousel of a transport stream in accordance with an embodiment of the present invention.

FIG. 3 is a schematic diagram of a structure of data carousel of a transport stream in accordance with an embodiment of the present invention. Referring to FIG. 2 and FIG. 3, the DSMCC section of the transport stream comprises at least one DII 531 and a plurality of DDBs. For clarity of description of the structure of the transport stream, the DDBs are divided into plural first DDBs 534, plural second DDBs 535, and plural third DDBs 536. Each first DDB 534 comprises content data corresponding to a part of the firmware 40, each second DDB 535 comprises content data corresponding to another part of the firmware 40, and each third DDB 536 comprises a part of the content file data Ct. The DII 531 comprises information for controlling the DBBs, for example, information for combining the first DDBs 534 and second DDBs 534 to a first module 532, and information for combining the third DDBs 536 to a second module 533. Data of the first module 532 corresponds to the firmware 40. In this embodiment, only one module may be applied to carry the firmware 40, so that the transport stream can simultaneously carry the content file data Ct of multiple channels.

A packing layer of each first DDB 534 comprises a first processing method tag and a first content data. The first processing method tag indicates a first data processing method, where the first content data is processed by the first processing method to form a part of the firmware. A packing layer of each second DDB 535 comprises a second processing method tag and a second content data. The second processing method tag indicates a second data processing method where the second content data is processed by the second data processing method to form another part of the firmware.

In this embodiment, each of the processing method tags is shown by a single bit. The first processing method tag may be marked as 0x0, indicating that the first data processing method processes the first content data of the first DDB 534 without compression to form one part of the firmware 40. The second processing method tag may be marked as 0x1, indicating that the second data processing method is a compression method. The second content data of the second DDB 535 is compressed data which is decompressed according to the second data processing method to form another part of the firmware 40. Accordingly, files of the firmware 40 are selectively compressed according to file sizes of the compressed firmware 40 to obtain a compressed firmware 40. In addition, the compression method is not limited to the examples in the embodiments; in one embodiment, several different types of compression methods are used to compress/decompress content data of DDBs, while processing method tags are indicated using multiple bits. The files of the firmware 40 are compressed via appropriate compression methods selected according to sizes of the files of the compressed firmware 40 to obtain the smaller compressed firmware 40.

According to another embodiment, the packing layers of the first and second DDBs 534 and 535 may comprise at least one writing position tag (described below) instead of the processing method tags. More specifically, one example with explanation of the structure of the packing layers of the first and second DDBs 534 and 535 is shown in Table 1.

TABLE 1

| | |
|---|---|
| ID Tag (6 bits) | 0x110010 (first and second DDBs 534 and 535) |
| Indication code (1 bit) | 0x1 (indicating whether the first and second DDBs 534 and 535 belong to a new module or a existing module) |
| Processing method tag (1 bit) | 0x1 or 0x0 (representing whether the contend data are compressed) |
| Module index (12 bits) | Indicating an index of a current module |
| Last module index (12 bits) | Indicating an index of a last module |
| Module size (24 bits) | Supporting 8 Mbytes/sec |
| Writing position tag (32 bits) | Indicating a memory position (pointer), where the content data of the first and second DDBs 534 and 535 are to be written |
| Content data | Original data or compressed data |

Generally, each DDB has 4066 bytes of data, so that the content data of the first and second DDBs 534 and 535 have (4066−(88/8))=4055 bytes.

Figure 4:
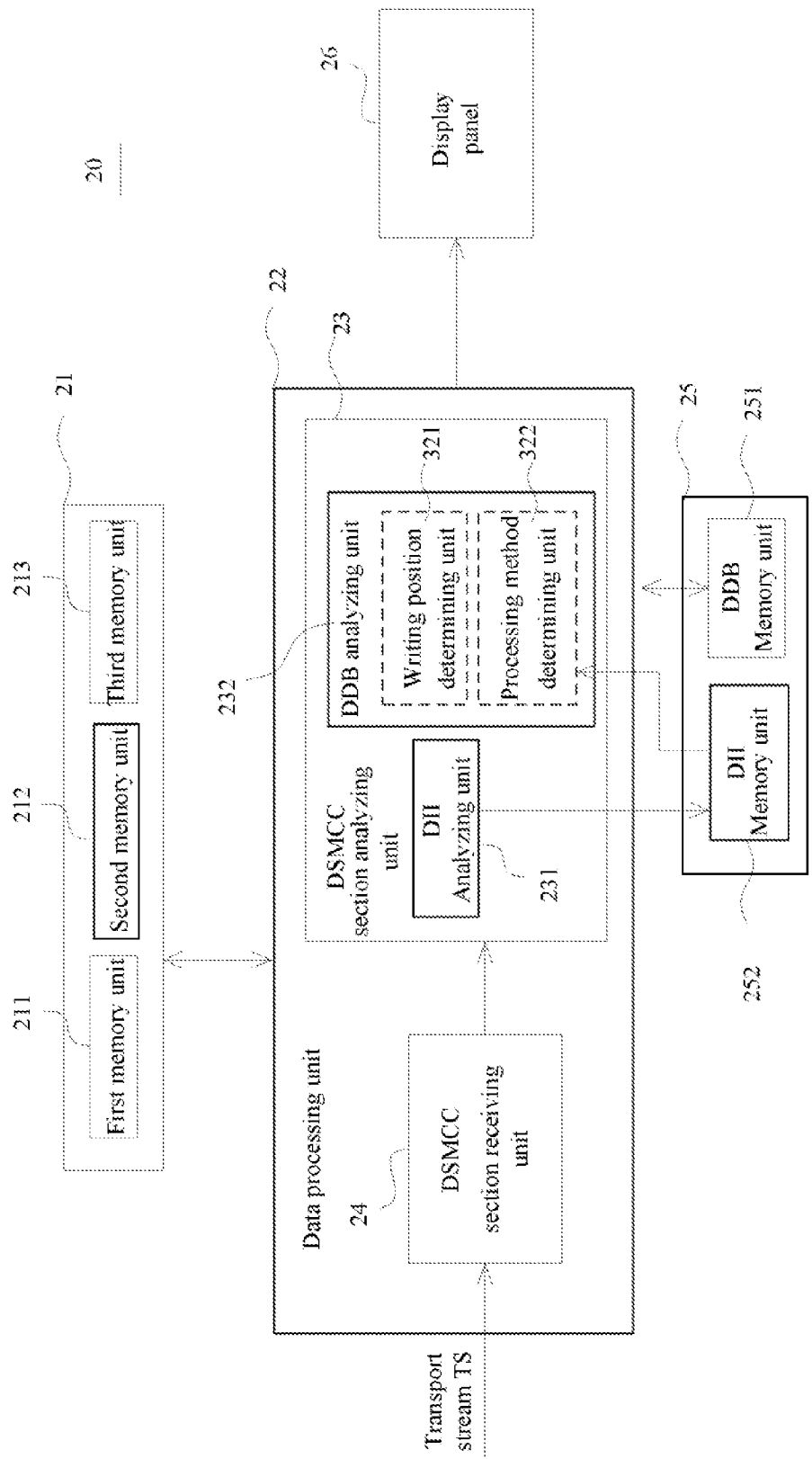
FIG. 4 is a block diagram of a digital TV in accordance with an embodiment of the present invention.

FIG. 4 shows a block diagram of a digital TV in accordance with an embodiment of the present invention. The digital TV 20 is used for receiving a transport stream that carries a firmware 40 and a content file data Ct. The digital TV 20 comprises a first memory module 21, a data processing unit 22, a second memory module 25, and a display panel 26. The first memory module 21 comprises a first memory unit 211, a second memory unit 212, and a third memory unit 213. The second memory module 25 comprises a DII memory unit 252 and a DDB memory unit 251. The data processing unit 22 comprises a DSMCC section receiving unit 24 and a DSMCC section analyzing unit 23.

The DSMCC section receiving unit 24 receives the transport stream TS, and retrieves from the transport stream data regarded as the DSMCC section. The DSMCC section is then transmitted to the DSMCC section analyzing unit 23. The DSMCC section analyzing unit 23 retrieves the portion of DSMCC section that was not previously received according to the received DSMCC section in the DII memory unit 252. The DSMCC section analyzing unit 23 comprises a DII analyzing unit 231 and a DDB analyzing unit 232. The DII analyzing unit 231 analyzes a DII 531 of a DSMCC section of the transport stream in order to retrieve module information for controlling the DDBs, and temporarily store the module information to the DII memory unit 252. The DDB analyzing unit 232 analyzes the DDB to retrieve data for structuring the first module 532 and the second module 533, and temporarily stores the data into the DDB memory unit 251.

The DDB analyzing unit 232 comprises a processing method determining unit 322, which identifies a processing method tag of a DDB of a DSMCC section, and processes a content data of the DDB of the DSMCC section according to a data processing method indicated by the processing method tag, so as to form a part of the firmware 40.

More specifically, when the DDB analyzing unit 232 determines that the DDB (i.e., the third DDBs 536) of the DSMCC section contains a part of a content file data Ct, the part of the content file data Ct is retrieved and is stored into the DDB memory unit.

When the processing method identifying unit 322 of the DDB analyzing unit 232 determines a processing method tag of the DDB of the DSMCC section, a content data of the DDB of the DSMCC section is processed according to the data processing method indicated by the processing method tag, so as to form a part of the firmware 40. In this embodiment, a value of the processing method tag may be 0x0 or 0x1. When the value of the processing method tag is 0x0, it means that the data processing method of the DDB processes the content data of the DDB without compression; when the value of the processing method tag is 0x1, it means that the data processing method of the DDB performs a decompression process to the content data of the DDB because the content data as received is indicated as previously compressed. Therefore, when the processing method identifying unit 322 identifies that the processing method tag of the DDB of the DSMCC section is 0x0, the content data of the DDB forms a part of the firmware 40. When the processing method identifying unit 322 identifies that the processing method tag of the DDB of the DSMCC section is 0x1, the content data of the DDB is decompressed to form a part of the firmware 40.

The DDB analyzing unit 232 temporarily stores the parts of the firmware 40 into the DDB memory unit 251 (in an embodiment, the content data are temporarily stored in the DDB memory unit 251, and are decompressed when the amount of the content data reaches a predetermined number). When the DSMCC section analyzing unit 23 obtains all the DDB content data that is for structuring the first module 532, by utilizing the module information in the DII memory unit 252, the DSMCC section analyzing unit 23 combines the DDB content data (the first and second DDBs 534 and 535) together to obtain firmware 40. After that, the firmware 40 is cached in the first memory unit 211 in order to update firmware 40 of digital TV 20.

In addition, by utilizing the module information in DII memory unit 252, the DSMCC section analyzing unit 23 combines the DDB content data (the third DDBs 536) which contains part of the content file data Ct, so as to obtain and display the complete content file data Ct of the second module 533 on the display panel 26. Therefore, a user can view AV programs displayed on the digital TV 20 while the firmware 40 of the digital TV 20 is being updated.

In another embodiment, instead of using the processing method identifying unit 322, the DDB analyzing unit 232 may comprise at least one writing position identifying unit 321. Each of packing layers of a plurality of DDBs (the first and second DDBs 534 and 535) comprises at least one writing position tag. The writing position identifying unit 321 determines a memory position (pointer) where a content data of a DDB is to be written in the first memory unit 211 according to the writing position tag of the DDB. The DSMCC section analyzing unit 23 writes the DDB content data into the first memory unit 211 according to module information in the DII memory unit 252 and information of the position provided by the writing position identifying unit 321. After the DSMCC section analyzing unit 23 obtains the last of the DDB content data for structuring the first module 532, the DSMCC section analyzing unit 23 writes the last content data into the first memory unit 211, where the firmware 40 of the digital TV 20 completes update. In the prior art, all DDB content data for structuring the first module 532 are temporarily written into the DDB memory unit 251 to form the firmware 40, and is then written into the first memory unit 211. In this case, the memory space of the second memory module 25 must exceed the size of the firmware 40, to properly accommodate storage of the updated firmware 40 without error. In contrast, in this embodiment, the space of the DDB memory unit 251 is only required to store a single DDB, since once a DDB is collected, the DDB is written into the first memory unit 211. Therefore, the firmware is intermittently updated. The memory space of the second memory module 25 is only required to be larger than the capacity of a single DDB, e.g., 4066 bytes, thereby reducing the required memory space of the second memory module 25. In addition, should the digital TV 20 be turned off before the DDB content data for structuring the first module 532 are completely collected, it is necessary to complete collection of the content data and structure all over again. In this embodiment of the present invention, the received DDB content data for structuring the first module 532 are written into the first memory unit 211 after having been temporarily stored in the DDB memory unit 251; this means that the data are downloaded intermittently. For example, when the digital TV 20 is turned off before the content data of the DDBs for structuring the first module 532 are not yet completely collected, the digital TV 20 continues to receive the content data that was not previously received after restart.

In another embodiment, the second memory unit 212 stores a previous version of the firmware 40, and the third memory unit 213 stores a boot program predetermined value. For description convenience, the boot program predetermined value is defined as performing a boot program via the previous version of the firmware 40 stored in the second memory unit 212. When the digital TV 20 is turned on, the third memory unit 213 is first accessed, and the boot program is performed by accessing the previous version of the firmware 40 stored in the second memory unit 212 according to the boot program predetermined value. When the digital TV 20 is operated, in the event that the data processing unit 22 determines that the DSMCC section of the transport stream comprises a new version of the firmware 40, the firmware 40 is retrieved from the transport stream and is stored into the first memory unit 211. When the firmware 40 is completely downloaded, the boot program predetermined value stored in the third memory unit 213 is changed to perform the boot program using the new version of the firmware 40 stored in the first memory unit 211. When the turned-off digital TV 20 is again turned on, the boot program is performed by accessing the new version of the firmware 40 stored in the first memory unit 211. Accordingly, not only the problem that the previous version of the firmware 40 cannot be changed when the digital TV 20 is operated is avoided by the present invention, but also the problem that the digital TV 20 is down due to the changed version of the firmware 40. More specifically, the second memory module 25 is typically implemented as a dynamic random access memory (DRAM). The third memory unit 213 may be an electronically erasable programmable read-only memory (EEPROM). The first memory unit 211 and the second memory unit 212 are respectively independent flashes; or the first memory unit 211 and the second memory unit 212 are in divided blocks of a flash.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of using a single transport stream (TS) for intermittently updating a firmware in a data processing apparatus, the method comprising:
    processing a first content data to form a part of the firmware by a first processing method, which is indicated by a first processing method tag in a first download data block of the transport stream; and
    processing a second content data to form another part of the firmware by a second processing method, which is indicated by a second processing method tag in a second download data block of the transport stream, the first processing method being different from the second processing method;
    wherein processing the first content data by the first processing method comprises processing the first content data without compression.

2. The method as claimed in claim 1, wherein the first download data block of the transport stream comprises the first processing method tag and the first content data, the second download data block of the transport stream comprises the second processing method tag and the second content data, and the transport stream comprises a download information indication for recording information associated with the first and the second download data blocks.

3. The method as claimed in claim 2, wherein the first download data block and the second download data block further comprise a writing position tag respectively, for respectively indicating a memory position of a digital TV memory where the first content data and the second content data are to be written respectively.

4. The method as claimed in claim 1, wherein processing the second content data by the second processing method comprises processing the second content data with a predetermined compression method.

5. The method as claimed in claim 4, wherein entropy of said part of the firmware is smaller than entropy of said another part of the firmware.

6. The method as claimed in claim 4, wherein processing the second content data by the second processing method further comprises decompressing the second content data by a second compression method to form said another part of the firmware.

7. The method as claimed in claim 1, wherein processing the first content data by the first processing method further comprises decompressing the first content data by a first compression method to form said part of the firmware.

8. A data processing apparatus, adapted to process a transport stream carrying a firmware, the transport stream comprising a digital storage media command and control (DSMCC) section, the data processing apparatus comprising:
    a DSMCC section receiving unit, for receiving the transport stream, and retrieving the DSMCC section from the transport stream; and
    a DSMCC section analyzing unit, comprising: a download data block analyzing unit, comprising a processing method identifying unit for determining a processing method tag of a download data block in the DSMCC section, and for processing a content data of the download data block according to a data processing method indicated by the processing method tag to generate a part of the firmware.

9. The data processing apparatus as claimed in claim 8, wherein the DSMCC section analyzing unit further comprises a download information indication analyzing unit for analyzing a download information indication of the DSMCC section from which the DII information for controlling the download data block is retrieved.

10. The data processing apparatus as claimed in claim 8, wherein when the processing method identifying unit determines that the data processing method represents that the content data of the download data block is processed without compression, the content data of the download data block forms the part of the firmware; and when the processing method identifying unit determines that the data processing method indicated by the processing method tag of the download data block represents that the content data is decompressed according to a predetermined compression method to form the part of the firmware.

11. The data processing apparatus as claimed in claim 10, wherein the download data block analyzing unit determines and retrieves a part of the content file data of the download data block.

12. The data processing apparatus as claimed in claim 8, wherein the download data block analyzing unit of the DSMCC section analyzing unit further comprises a writing position identifying unit, for identifying a writing position tag of the download data block to accordingly determine a memory position of a memory where the content data of the download data block is to be written.

13. A digital television (TV), applied to receive a transport stream comprising a digital storage media command and control (DSMCC) section and carrying a first firmware and a content file data, the digital TV comprising:
 a first memory module, comprising a first memory unit;
 a second memory module, comprising a download data block memory unit and a download information indication (DII) memory unit;
 a data processing apparatus, comprising:
 a DSMCC section receiving unit, for receiving the transport stream, and retrieving from the transport stream the DSMCC section; and
 a DSMCC section analyzing unit, comprising: a download data block analyzing unit, comprising a processing method identifying unit, for identifying a plurality of processing method tags of a plurality of download data blocks of the DSMCC section, and selectively processing a content data of each download data block according to the processing method tags, so as to generate a part of the first firmware.

14. The digital TV as claimed in claim 13, wherein the DSMCC section analyzing unit further comprises a DII analyzing unit, for analyzing a DII of the DSMCC section to retrieve information for controlling the download data blocks from the DII, and storing the information into the DII memory unit.

15. The digital TV as claimed in claim 14, wherein the DSMCC section analyzing unit of the data processing apparatus generates the first firmware according to the information for controlling the download data blocks and the processed content data of the download data blocks, where the first firmware stores in the first memory unit.

16. The digital TV as claimed in claim 15, wherein the DSMCC section analyzing unit temporarily stores the processed content data of the download data blocks into the download data block memory unit, and when the DSMCC section determines that all content data of the download data blocks for structuring the firmware are completely collected according to information for controlling the download data blocks, the first firmware is formed and is stored into the first memory unit.

17. The digital TV as claimed in claim 15, wherein the download data block analyzing unit of the DSMCC section analyzing unit further comprises a writing position identifying unit for determining a writing position tag of each download data block of the DSMCC section for determining a memory position of the first memory unit according to the writing position tag of each download data block, so as to write the content data of each download data block at the position.

18. The digital TV as claimed in claim 15, wherein the first memory module further comprises:
 a second memory unit, for storing a second firmware; and
 a third memory unit, for storing a boot procedure default value, for the digital TV to boot utilizing the second firmware stored in the second memory unit or the first firmware stored in the first memory unit according to the boot procedure default value.

19. The digital TV as claimed in claim 14, wherein, when the processing method identifying unit determines that the data processing method indicated by the processing method tag of the download data block comprises processing the content data without compression, the content data forms the part of the first firmware; and when the processing method identifying unit determines that the data processing method indicated by the processing method tag of the download data block comprises processing the content data by a predetermined compression method, the content data forms the part of the first firmware.

* * * * *